United States Patent [19]

Mori

[11] Patent Number: 4,536,828
[45] Date of Patent: Aug. 20, 1985

[54] LIGHTING DEVICE

[76] Inventor: Kei Mori, 3-16-3-501, Kaminoge, Setagaya-ku, Tokyo, Japan

[21] Appl. No.: 576,765

[22] Filed: Feb. 2, 1984

Related U.S. Application Data

[63] Continuation of Ser. No. 275,782, Jun. 22, 1981, abandoned.

[30] Foreign Application Priority Data

Jun. 27, 1980 [JP] Japan ................................. 55-87280

[51] Int. Cl.³ .............................................. F21V 7/04
[52] U.S. Cl. ...................................... 362/32; 362/300; 362/301; 362/302; 362/303; 362/304; 362/305; 362/355; 362/356; 362/361; 362/433; 362/442; 362/448; 362/410
[58] Field of Search ................ 362/308, 328, 327, 329, 362/297, 309, 32, 410, 300, 301, 302, 303, 346, 349, 307, 356, 361, 355, 343, 350, 351, 360, 304, 305, 433, 442, 448

[56] References Cited

U.S. PATENT DOCUMENTS

| | | | |
|---|---|---|---|
| 1,603,253 | 10/1926 | Appel | 362/300 |
| 2,068,246 | 1/1937 | Rolph | 362/328 |
| 2,443,561 | 6/1948 | Greenwald | 362/32 |
| 2,817,008 | 12/1957 | Cloer | 362/356 |
| 3,388,249 | 6/1968 | Siegel et al. | 362/413 X |
| 3,536,908 | 10/1970 | Oster | 362/32 X |
| 3,749,906 | 7/1973 | Thiry | 362/301 |
| 3,832,539 | 8/1974 | Oram | 362/301 X |

FOREIGN PATENT DOCUMENTS 422215  3/1911  France ................................ 362/301

*Primary Examiner*—Stephen J. Lechert, Jr.
*Attorney, Agent, or Firm*—Merchant, Gould, Smith, Edell, Welter & Schmidt

[57] ABSTRACT

A lighting device of the free-standing type, capable of diffusing beams of light rays propagating through and emitting from the optical wave guides. A reflecting member is placed opposite the exit end of the optical wave guides to diffusingly reflect and diverge the light rays issuing from the optical wave guides thereby to light up a wide area with soft light rays.

8 Claims, 3 Drawing Figures

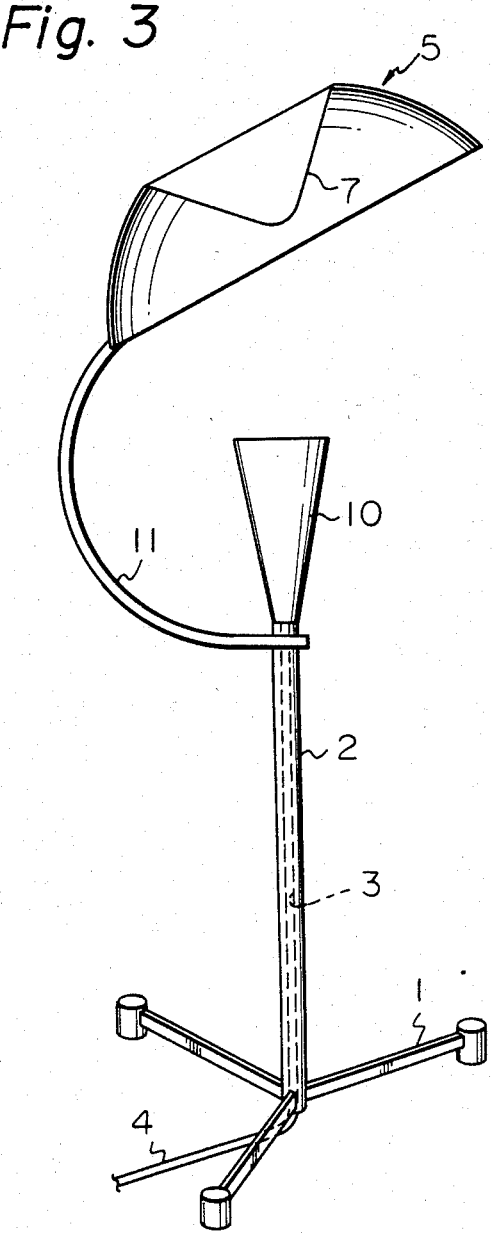

LIGHTING DEVICE

This is a continuation, of application Ser. No. 275,782, filed June 22, 1981, now abandoned.

BACKGROUND OF THE INVENTION

My invention relates to the art of interior lighting and, more particularly, to a novel lighting device wherein light rays propagating through optical wave guides are used as a light source.

My invention may be advantageously used for lighting the interior of human occupancies, such as rooms of a building, underground bomb shelters, underwater enclosures, and so on, with the natural solar beams or rays collected on the earth's surface.

Hitherto, various attempts have been made for utilization of the solar energy reaching upon the earth's surface. However, most of the prior art solar energy systems involve the transformation of the captured solar energy into electric or thermal energy and as far as I am aware there are very few that directly utilize the solar beams themselves as a source of optical energy. In lighting applications, it is obvious that the use of the solar energy in the form of optical energy is advantageous since transformation loss is obviated.

With a view to provide a solar system which employs the solar radiation as a light source, I have previously developed an apparatus for collecting the solar beams capable of condensing the solar beams so that they are introduced into a bundle of optical wave guides (Japanese Patent Laid-Open Publication No. 55-28055). Being reflected at the boundary surface of the optical wave guide, the light rays or solar beams propagate therealong and then issue out of the optical wave guide from its exit end. The angle of emission of the light rays as issuing from the exit end of the wave guide depends on the critical angle of incidence of the material forming the optical wave guide and, normally, is not greater than 48° for an optical fiber made from pure silicate. When the interior of a room is illuminated with light rays issuing from a bundle of optical wave guides, illumination takes place in a spotlight-like fashion. Thus, it is not possible to illuminate a sufficiently wide area with soft light rays.

SUMMARY OF THE INVENTION

The primary object of the invention is to overcome the foregoing drawbacks.

According to the invention, there is provided a lighting device capable of diffusing beams of light rays propagating through and issuing from an end of optical wave guides wherein a reflecting member is placed opposite the exit end of the optical wave guides to effectively diffuse the beams so that an extended area is illuminated with soft light rays. In an embodiment of the invention, the device takes the form of a lamp stand provided with a shade and a reflecting member is provided at a central portion of the shade.

BRIEF DESCRIPTION OF THE DRAWING

FIG. 3 is a perspective view, partly in cross-section, of still another embodiment.

DESCRIPTION OF THE PREFERRED EMBODIMENTS

Figure 1:
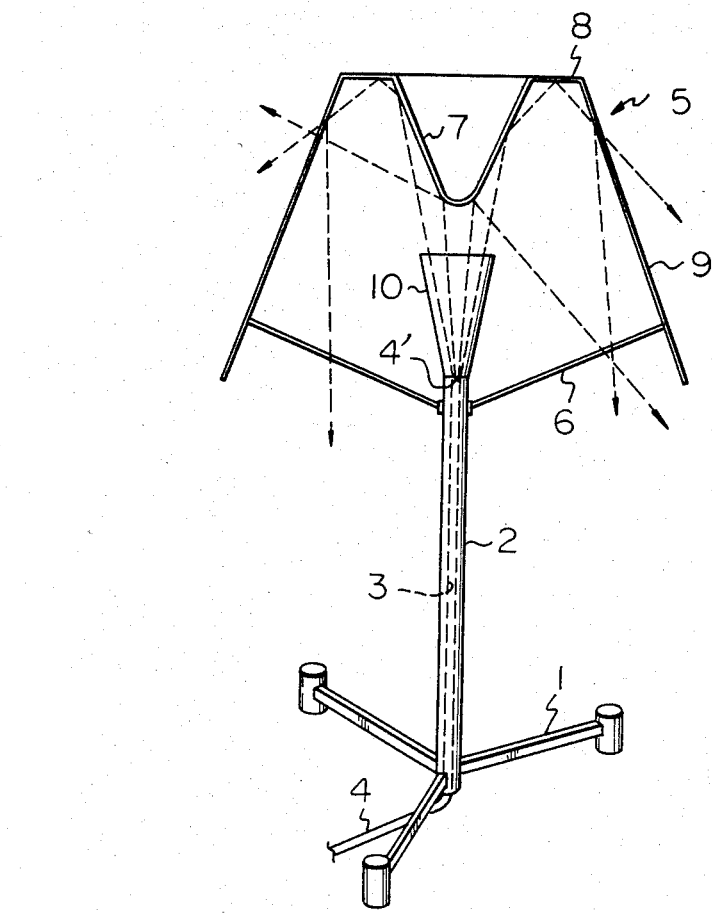
FIG. 1 is a perspective view, partly in cross-section, of an embodiment of the invention as applied to a light stand.

Referring now to FIG. 1, the lighting device according to the invention includes a base 1 on which is mounted a tubular column 2. The tubular column 2 has an elongated through-hole 3 in which is accomodated a bundle of optical fibers 4 covered with a protective sheath. The free end of the optical fibers 4 is positioned near the top of the tubular column. The other end of the optical fibers is connected to a solar beam collecting apparatus (not shown) which is installed at the building top, sea surface, ground surface or any other suitable location where solar beams arrive. A shade 5 is mounted on the upper portion of the column 2 by means of stays 6. The shade 5 comprises a central, convex, light reflecting portion 7 which is placed opposite the exit end of the optical fibers, a flat portion 8 adjacent to said central portion 7, and a downwardly slanted conical peripheral portion 9. The shade may be made from a sheet or board of any suitable materials such as metal, paper and plastics having a sufficient rigidity. The central convex portion 7 may be substantially conical (See FIG. 1, numeral 7) and may be specular and coated with a thin layer of metal by a conventional vacuum evaporation technique to form a reflecting member. Alternatively, the reflecting member may be formed by coating the central portion 7 with a highly light diffusive coatings to diffusingly reflect the light rays emitted from the optical fibers. The adjacent portion 8 may be made translucent or opaque and may be disc shaped. The peripheral portion 9 may be translucent and may be generally conical (See FIG. 1, numeral 9). The solar beams as propagated through the optical fibers are emitted from the open end 4' of the fibers with an angle of emission roughly equal to the critical angle of incidence of the optical fibers and impinge upon the reflecting portion 7 whereby they are diffused and reflected as shown by arrows to thereby light the foot area of the lighting device with a sufficient intensity as well as to illuminate the surrounding area with subdued light rays.

It would be apparent that, if it is desired that the whole of the solar beams issuing from the optical wave guide are to be diffused by the central diffusing portion 7, said portion must be so positioned that the angle which the base of the convex portion 7 forms with respect to the light emitting end 4' of the optical wave guides is not less than about 45°.

It is preferable to provide a translucent or opaque hood 10 at the top of the tubular column 2 so that the glaring point formed at the end of the optical fibers is shaded from the eyes.

Figure 2:
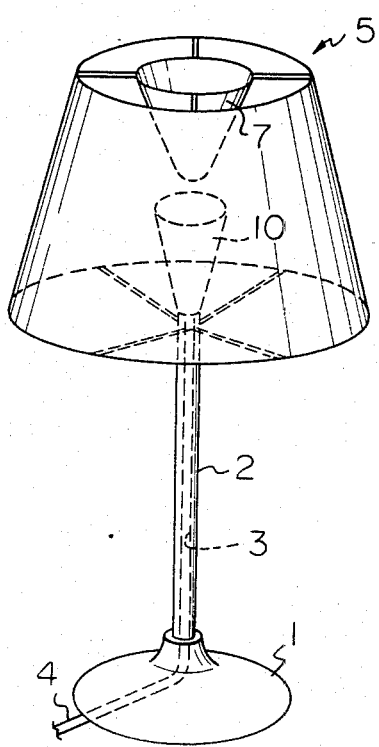
FIG. 2 is a perspective view of another embodiment.

FIG. 2 shows another embodiment wherein like reference numerals indicate like members. The main difference of this embodiment from that illustrated in FIG. 1 is that the adjacent portion 8 is cut away to ensure that a majority of those light rays which are directed upwardly by the central reflecting portion 7 are thrown towards the ceiling thereby increasing the luminous intensity of that area. (See FIG. 2.)

FIG. 3 illustrates still another embodiment of the invention which comprises a flexible arm 11 for mounting the shade 5 on the column 2. Thus, the diffused and reflected solar beams may be directed to any direction desired.

I claim:

1. A room illuminating device for diffusing beams of light rays propagating through and emitting from an optical wave guide, which comprises:
   a base,
   a support mounted on said base and having an elongated cavity for receiving therein at least one optical wave guide, said cavity being open at least at the top to ensure that the light rays can be emitted upwardly,
   a light ray transmitting optical wave guide passing through said cavity,
   a frusto conical hood affixed over said open top of said elongated cavity,
   means for reflecting the light rays issuing from the optical wave guide, said means including, (a) a substantially conical central convex portion projecting downwardly, (b) a partially cut away disc shaped flat portion continuous to said central portion conformed so that a majority of those light rays which are directed upwardly by said central portion are thrown toward the ceiling, and (c) a generally conical downwardly slanted peripheral portion, and
   means for connecting said reflecting means to said support in such a manner that said central convex portion faces the top end of said support.

2. A device as set forth in claim 1, wherein said central portion has a reflecting mirror surface.

3. A device as set forth in claim 1, wherein said central portion is coated with a light diffusive coating.

4. A device as set forth in claim 1 wherein said connecting means is a flexible arm.

5. A device as set forth in claim 1 wherein said downwardly slanted peripheral portion is constructed of a translucent material.

6. A device as set forth in claim 1 wherein said hood is constructed of a translucent material.

7. A device as set forth in claim 1 wherein said hood is constructed of an opaque material.

8. A device as set forth in claim 1 wherein said flat portion is constructed of a translucent material.

* * * * *